April 20, 1948.　　　　D. F. GOOD　　　　2,440,197
PEANUT PICKER WITH GASEOUS SUSPENSION AND SIFTING
Original Filed Sept. 21, 1942　　3 Sheets-Sheet 1

Inventor
D. F. Good
By
Attorney

April 20, 1948. D. F. GOOD 2,440,197
PEANUT PICKER WITH GASEOUS SUSPENSION AND SIFTING
Original Filed Sept. 21, 1942 3 Sheets-Sheet 3
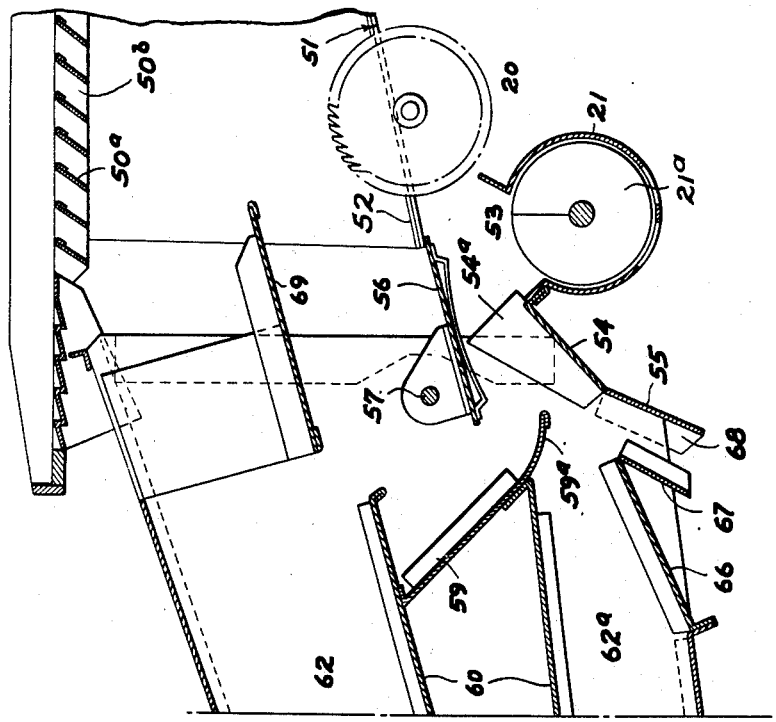
Fig. 3.
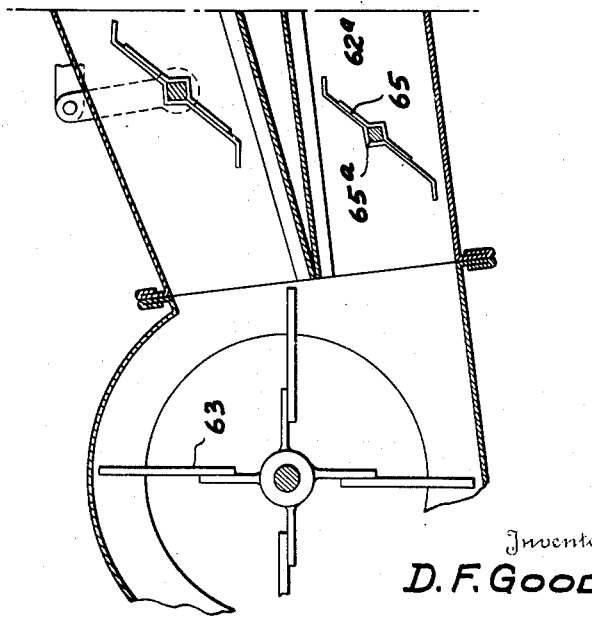
Inventor
D. F. Good,
By
Attorney Patented Apr. 20, 1948

2,440,197

UNITED STATES PATENT OFFICE 2,440,197

PEANUT PICKER WITH GASEOUS SUSPENSION AND SIFTING

Daniel F. Good, Waynesboro, Pa., assignor to Frick Company, Waynesboro, Pa., a corporation of Pennsylvania Original application September 21, 1942, Serial No. 466,470. Divided and this application July 6, 1944, Serial No. 543,678

6 Claims. (Cl. 209—33)

This invention relates to agricultural implements and more particularly to those used primarily in harvesting.

This invention specifically relates to a peanut picker and includes improvements over the machine disclosed in my Patent No. 2,349,262, dated May 23, 1944.

This application is a division of my application Serial No. 466,470, filed September 21, 1942.

Heretofore peanut pickers have had certain undesirable features and drawbacks which have made them objectionable and unsatisfactory. These machines have not been durable; they have been too expensive and required too much personal care. Therefore, they were not only to a degree impractical, but in fact a nuisance. In addition to the above undesirable characteristics the machines have not satisfactorily performed the functions for which they were designed.

It is an object of the invention to provide a means adjacent the place of inter-engagement of the rotary picking and feeding cylinder for subjecting the vines and peanuts to an air blast whereby dust, dirt, and other extraneous matter are removed from the nuts and vines during the major picking operation.

Briefly described, the machine comprises reciprocable racks and grid pans, stemmer saws, stone removing means and air blast means for cleaning the nuts.

Figure 1:
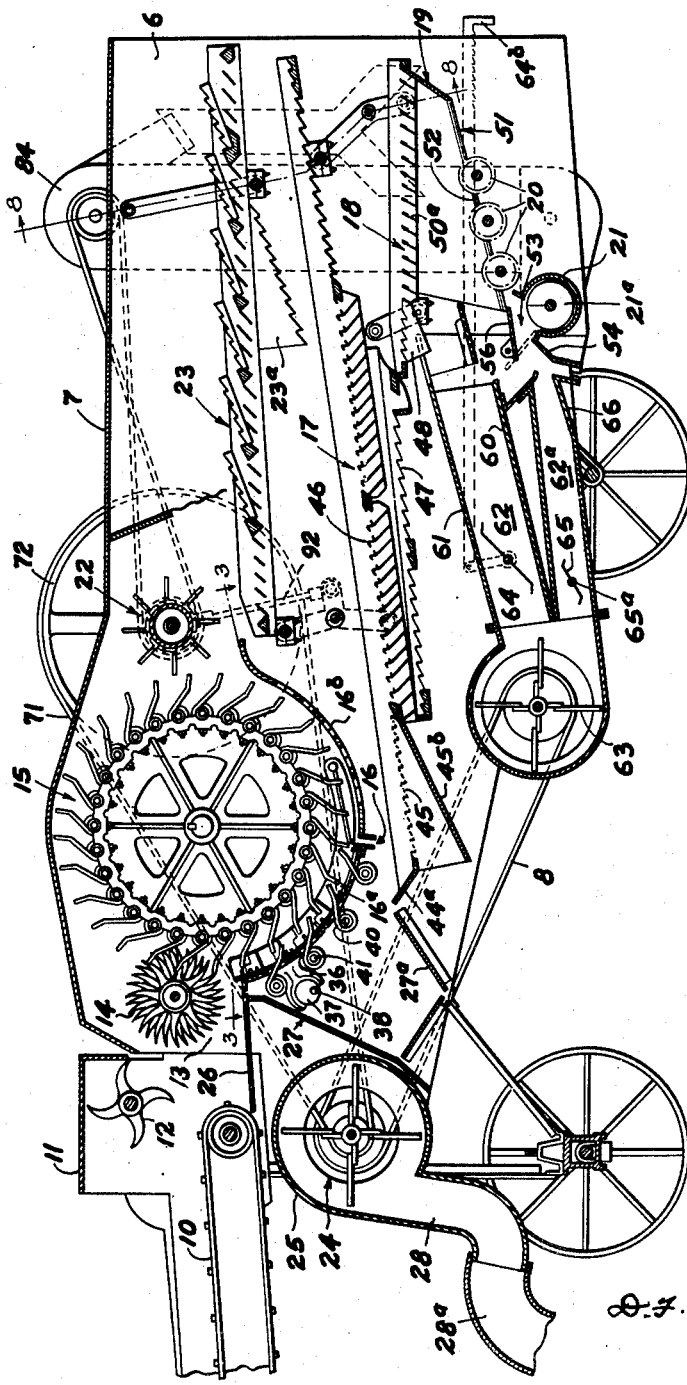
Figure 2:
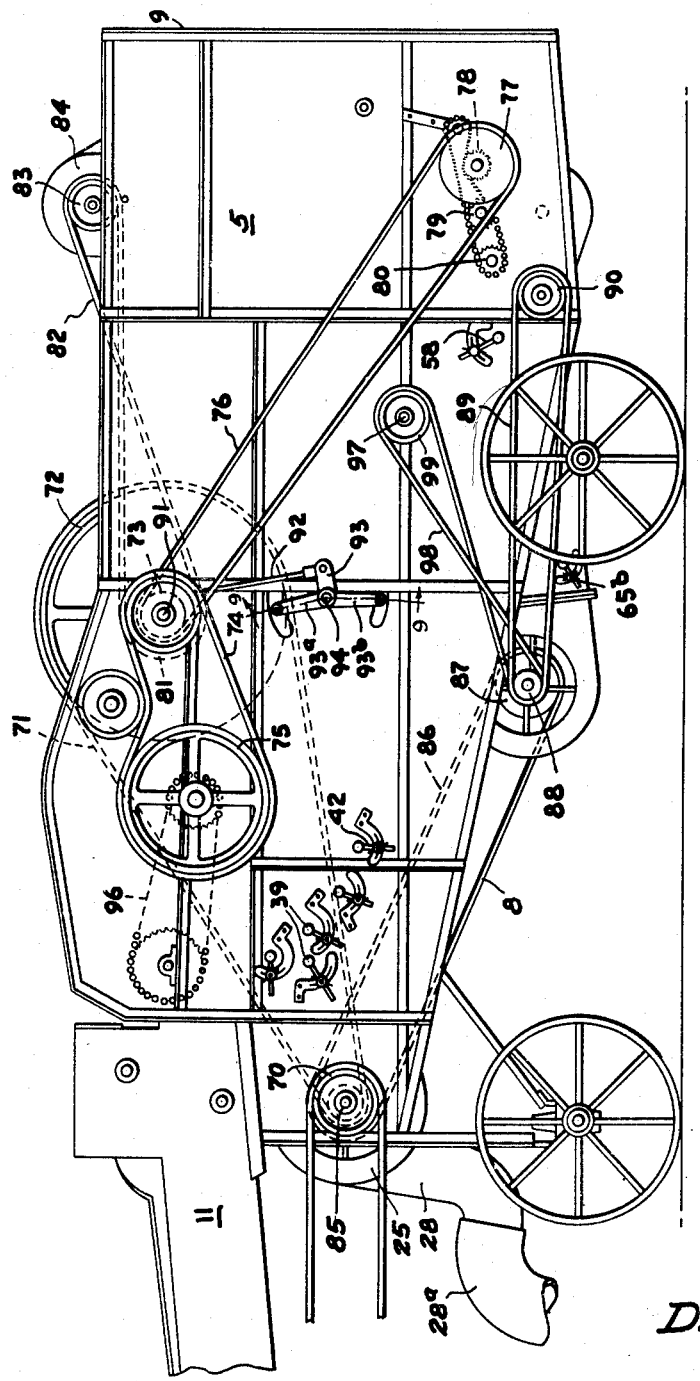

The machine further incorporates improved features including:

Provision of means for freeing the peanuts of stones or like extraneous matter which may have been carried through the machine with the peanuts to the delivery end of the machine;

An improved and more efficient grid pan and cleaning grid assembly;

Simplification in construction while maintaining high efficiency;

And other features of novelty and advantage which will become apparent in view of the following description taken in conjunction with the drawings, wherein:

Figure 1 is a longitudinal section of a peanut picking machine in accordance with the present invention;

Fig. 2, a view in side elevation of the machine of Fig. 1; and

Fig. 3, an enlarged longitudinal section of the wind blast unit or fan mill.

Referring to the drawings, particularly Figs. 1 and 2, the parts of the machine are enclosed by a housing including side walls or panels 5 and 6, top panels 7, open bottom panels 8, and open end panels 9. A conveyor 10 is adapted to be loaded with vines so that they may be carried by the conveyor into housing 11 of the machine and engaged by a rotary first feeding cylinder 12 and fed to a head chamber 13, where the vines are taken by a second feeding cylinder 14 (rotating counter-clockwise as viewed in Fig. 1) and carried around to picking cylinder 15, which likewise rotates in a counter-clockwise direction and at a predetermined speed with respect to the second feeding cylinder.

Below the picking cylinder is a concave bed 16 consisting of sections 16a and 16b, the former constituting the concave bed proper which is adjustable and the section 16b constituting a stripping screen. Extraneous matter, including trash, dust, dirt or the like, are removed through the adjustable section 16a and the nuts pass into and through the openings in section 16b onto a grid pan 17 which advances the nuts to the right as viewed in Fig. 1 and thence into wind blast cleaning grid 18 through which the nuts fall onto pan 19, during which they are subjected to the action of the cleaning fan and to the stemmer saws 20 and then pass, either directly into the peanut delivery auger or discharge conveyor trough 21 for movement by conveyor auger 21a therein or indirectly through the stone cleaning unit and then to discharge conveyor trough 21.

The vines are taken by stripping cylinder 22 and thrown onto vine rack 23, which progresses the vines to the rear of the machine and discharges them therefrom for baling, any nuts carried with the vines falling through the vine rack onto grid section (to be described) of pan 17. At the rear of the vine rack a return section 23a is installed to carry any nuts that may drop through at this point to the grid of pan 17.

As the vines are fed into the head chamber 12, they are subjected to the suction action of a dust collector or suction fan 24 mounted in housing 25 which is in suction communication through perforated feed board or partition 26 with the chamber 13 and also with the concave area through perforated partition 27. The area beneath the concave 16a may be closed off by partitions 27a to more effectively concentrate the suction action. The suction fan thus draws dust and dirt from the vines as they are fed into the machine and also during the stripping operation, the dust, dirt and other extraneous matter being discharged through conduit 28 and flexible extension 28a thereof, which may extend along the ground such distance as will ensure clearance of the dust down wind.

A feature of the present machine resides in the construction and mounting of the concaves and concave bed, generally indicated at 16. The concave bed proper 16a, or the section to which the vines are first subjected, comprises an arcuate-shaped body pan having a series of teeth or pins of different lengths projecting upwardly therefrom and which may be termed the concave bed teeth. The pan may be made of relatively heavy sheet metal or like material and is formed with a series of slots. The pan at its front edge is turned outwardly at an angle to provide a reinforcing nose which bridges the gap between the feed board 26 and the pan, and the rear edge is turned downwardly to reinforce the metal at this point.

Means are provided whereby the forward or concave bed proper 16a may be adjusted toward or from the picking cylinder 15. Accordingly, this section is provided with bearing yokes 36, note Fig. 1, which engage over cams or eccentrics 37 connected to cross shaft or rod 38, said shaft being provided with a crank or handle 39 (Fig. 2) on the exterior of the machine whereby it may be conveniently rotated to adjust the concave bed.

This adjustment is designed primarily to take care of plants or vines and nuts of varying sizes. Thus, should the peanuts be small, the concave bed 16a may be adjusted towards the picking cylinder 15, whereas if large, the adjustment may be away from said cylinder. In other words, the concave bed may be adjusted to always maintain the proper relation of the picking cylinder and concave teeth to prevent the breaking of nuts passing between the same, resulting in increased picking efficiency.

Coacting with the teeth of the picking cylinder 15 are a series of retarding concave pins or teeth 40, (Fig. 1), the said teeth being secured on cross shafts 41 which are rotatably mounted at opposite ends in bearings carried by the side walls of the machine and are each provided with an adjusting handle 42 (Fig. 2) accessible from the exterior of the machine. The concave pins or teeth 40 project through the slots in the concave bed section 16a and function in a manner similar to the retarding pins of the machine of my prior application Ser. No. 350,511 now Patent No. 2,349,262. However, in this instance they are adjustably mounted, so that they may be raised when the vines are tough and lowered when the vines are dry, thus removing the nuts from the tough vines or preventing the breakage of vines when dry. Furthermore, they are curved and preferably given a resilient or spring mounting similar to the teeth of the picker cylinder.

The slots, while being of sufficient size to enable the withdrawal of dust, sand and like particles from the vines by the suction fan 24 are not of such size as to permit the nuts to pass therethrough, the latter passing around to stripping screen 16b and falling through pear-shaped openings formed therein and onto the front solid section of grid pan 17.

The grid pan in its preferred form comprises a supporting frame including side rails, front inclined board 44a and cross pieces. The bed of the pan comprises a front corrugated nut-progressing section 45, an intermediate grid section 46 and a rear solid or non-perforated progressing section. These sections are individually removable and replaceable in the supporting frame.

The section 45 has a perforated screening surface for sifting out sand, dirt and the like and below this section is a catch pan 45b inclined forwardly and having its front end open to effect discharge of extraneous material caught by the pan.

The grid section 46 is provided with a series of screening openings which are of a size to readily permit peanuts to pass therethrough while at the same time catching lengths of vine pieces, sticks and the like which may pass with the nuts through the section 16b of the concave or stripping screen and progress the same rearwardly onto the solid section. The grid or screening section 46 is corrugated in a manner similar to the section 45 so as to progress the vine lengths, sticks and like chaff rearwardly, and immediately below the grid surface there is a series of downwardly and rearwardly inclined cross pieces which serve as baffles to return any sticks or stems that may tend to fall through the openings with the peanuts. To explain, such sticks and stems will fall endwise or substantially so, and hence they will "cock" in the grid openings with one end against the baffles and the reciprocatory action of the grid will throw them forwardly clear of the openings. In actual practice, the grid surface 46 may be made up of sheet metal pressed into the desired shape and the cross pieces may also be made of sheet metal and braced by brackets.

Below grid section 46 is a supplemental solid or non-perforated progressing pan 47 which is hung from the main pan and lies in a substantially horizontal plane with respect to the main upper section of the grid pan 17.

It will be noted that the main or upper section of the grid pan as a whole is inclined upwardly toward the rear of the machine. This tends to retard the movement of the peanuts or prevents a too rapid movement thereof over the grid consistent with efficient cleaning.

From section 47 the nuts are progressed rearwardly onto downwardly inclined blast-deflector section 48 which facilitates discharge of the nuts onto grid 18. The cleaner grid 18 is preferably made up of spaced cross strips 50a and longitudinal strips providing a series of rectangular openings, the cross pieces or strips 50a being inclined at an angle rearwardly to more effectively distribute the wind blast and direct it outwardly and upwardly so that its full force is applied to the discharge of the vines.

The peanuts drop through cleaning grid 18 onto bottom floor or pan 51 forming part of pan 19, which floor is inclined to the left as viewed in Fig. 1, or forwardly and downwardly, and is formed with a series of elongated slots 52 through which the stemmer saws 20 project.

Thus as the nuts drop through grid 18 they are subjected to the action of the stemmer saws 20, the stems dropping through the slots 52 and the peanuts passing to the entrance opening of hopper of delivery trough or conduit 21, note particularly Fig. 3.

The peanuts may either pass directly into the hopper opening 53 from the pan 51 or may be passed indirectly into said hopper over inclined baffle board 54 having side boards 54a and a chute section 55. This action is controlled by a valve member or board 56 which is fixed on a shaft 57 and rotatable by means of a handle 58 from the exterior of the machine. In rear of valve board 56 is a baffle or deflector board 59 which is connected to one end of a partition 60 and is provided with a curved extension 59a at its lower end.

The partition 60 divides the housing 61 of the wind blast or fan mill unit into upper and lower passages 62 and 62a, the blast being provided by fan 63. The blast through passage 62 is controlled by means of valve 64 mounted on shaft 64a and manually adjustable by handle 64b from the exterior of the machine; while the blast through passage 62a is controlled by valve 65 mounted on shaft 65a adjustable from the exterior of the machine by handle 65b. The forward end of the passage 62a is provided with an upwardly inclined baffle board 66 having connected to the front end thereof a chute board 67 which coacts with the board 55 to provide a discharge chute 68 for stones and like relatively heavy particles.

At the forward or discharge end of blast passage 62 is a deflector board 69 for properly directing the blast outwardly to the cleaning grid 18.

In the position shown in Figs. 1 and 3, the valve board 56 is adjusted to a position where it forms an extension of the bottom pan 51, so that the peanuts will be directed against baffle board 59 and curved extension 59a and thence drop by gravity onto baffle board 54; and as they drop through the space between extension 59a and baffle board 54 at the end of the lower wind blast passage 62a, the blast throws the peanuts into the hopper 53, any stones and like heavy particles dropping through the chute 68. Should conditions be such as not to require elimination of stones or like heavy particles, it is only necessary to swing the valve board 56 to the dotted line position shown in Fig. 1, whereupon the peanuts will drop directly into the hopper 53.

The trough 21 in which the delivery auger 21a operates is formed with a series of screening openings along the bottom portion thereof which are preferably oblong in shape, to effect removal of any dust and dirt that may remain at the final passage of the peanuts.

The drive from a suitable source may be applied to pulley wheel 70 from which it is taken by belt 71 to pulley 72 which drives the stripping cylinder 22. From the stripping cylinder the drive is taken by pulley 73 and belt 74 to pulley 75 which drives the picking cylinder. Also, from pulley 73 the drive is taken by belt 76 to pulley 77, the shaft for which carries a sprocket 78 having trained thereover link belt 79 which drives a series of sprockets 80 for the stemmer saws 20. Another pulley 81 transmits the drive from shaft 91 through belt 82 to pulley 83 which drives the sacker elevator 84, not shown in detail and forming no part of the present invention. The fan mill drive is taken from pulley 85 through belt 86 to pulley 87 secured on the fan shaft. Another pulley 88 mounted on said latter shaft transmits the drive through belt 89 to pulley 90, which drives the conveyor auger 21a.

The vine rack 23 and grid pan 17 are shaken or oscillated by means of crank connections on the opposite ends of the pulley shaft 91 which operate rods 92 with arms 93 of bell cranks (one set on each side of the machine), the latter in turn being secured on the opposite ends of shaft 94 and having arms 93a and 93b, arms 93a being pivotally connected to vine rack 23, and arms 93b being pivotally connected to grid pan 17. The cleaning grid 18 is pivotally connected with the rear end of the grid pan 17 by rocker arms to thereby transmit a similar shaking or oscillatory movement to both grids.

Second feeding cylinder 14 is positively driven in synchronism with the picking cylinder 15 by means of chain 96.

Counter shaft 97 driven by belt 98 and pulley 99 may be used to drive a drag stacker, not shown and forming no part of the present invention.

The operation in general is as follows: Vines with the nuts thereon are disposed on the conveyor 10 and are taken therefrom by feeding cylinders 12 and 14, the latter carrying the vines around into operative relation with the teeth 15a of the picking cylinder 15. The feeding cylinder 14, being rotated at a slower speed than the picking cylinder, exerts a holding or retarding action on the vines as the teeth of the picking cylinder rake the nuts therefrom. The picking cylinder carries the vines around to the concave bed 16a at which point the vines and nuts are subjected to the action of the retarding pins or teeth 40 as well as the pins or concave teeth, there being a further stripping action of the peanuts from the vines at this point. The suction blast is applied through the feed board 26 and partition 27 and through the slots of the concave bed 16a to withdraw dust and dirt and like extraneous matter and transmit the same a distance from the machine, preferably down wind. The vines are subjected to a further stripping action by the stripping screen section 16b, the nuts dropping through the pear-shaped openings of the said screen onto portion 45 of the grid pan 17. The nuts are progressed rearwardly onto the grid 46 of said pan, at which point vine lengths, sticks and like matter, which may have passed through the screen section 16b with the nuts, are separated from the latter and progressed rearwardly and finally removed at the rear of the machine by the wind blast, the nuts dropping through the grid section 46 onto blast deflector section 47, where they are progressed onto section 48 and thence onto cleaning grid 18 where they are acted on by the wind blast. From cleaning grid 18 the nuts drop onto pan 51, where they are subjected to the action of the stemmer saws 20.

Should conditions be such that stones and like heavy particles pass through the machine with the nuts, the valve board 56 may be turned to the position shown in Figs. 1 and 3, causing the nuts to pass onto baffle board 59, and its extension 59a and thence onto baffle board 54, at which point they are subjected to the action of the wind blast through passage 62a, which should be adjusted to the extent that it throws the nuts into the hopper 53 and permits the stones and like heavy particles to drop through discharge chute 68.

Actual experience has demonstrated the high cleaning efficiency of the machine, while at the same time the number of parts is less than usually found in machines of this type and manufacturing costs are relatively low.

It will be understood that certain changes in the construction and design of the machine as a whole as well as the respective parts may be adopted without departing from the spirit or scope of the present invention as defined by the appended claims.

What is claimed is:

1. In a peanut picking machine, a wind blast unit, a housing for the latter, means separating the housing into upper and lower wind blast passages, a cleaning grid subject to the action of the wind blast, a conveyor for removing nuts from the machine, said conveyor being provided with a hopper opening, a valve board coacting with said opening, a deflector board in rear of said valve board, said valve board being adjustable to permit the nuts to pass directly from said cleaning grid into said opening or direct the nuts rearwardly to said deflector board and thence into said opening, the nuts when passing rearwardly to said deflector board being subjected to the blast of the lower wind blast passage to remove stones and like heavy particles therefrom.

2. In a peanut picking machine, a cleaning grid, an inclined pan located beneath said cleaning grid to receive nuts therefrom, stemmer saws projecting upwardly through said pan to stem the nuts falling onto the latter, a conveyor including a trough having a hopper opening, a valve board located to close said opening from passage of nuts into the trough directly from said pan or direct the nuts rearwardly over said trough, a deflector board located in rear of said valve board for deflecting the nuts into said trough from said valve board, a wind blast, means for directing said blast onto the nuts falling from said deflector board and for lifting the nuts into said hopper opening thereby permitting any stones or like heavy particles to fall free of the nuts, and means for adjusting the wind blast.

3. In a peanut picking machine, a wind blast unit, a housing for the latter, means in said housing defining separate passages for the blast, a cleaning grid located in the path of the blast from one of said passages, a pan located beneath said cleaning grid receiving nuts falling through the latter, a discharge conveyor trough for receiving nuts from said pan, a valve board adjustably mounted adjacent the discharge end of said pan, the outlet of a second wind blast passage, and the inlet to said trough to selectively pass the nuts and any foreign matter present directly into said trough from said pan or direct the nuts and foreign matter into the path of the wind blast to the second of said passages, the nuts being separated from the stones and other heavy particles forming the foreign matter and projected into said trough by the force of said wind blast.

4. In a peanut picking machine having a picking cylinder, a work table ahead of said picking cylinder, wind blast means, housing means therefor, means defining separate passages for the blast, a cleaner grid located in the path of the blast from one of said passages, a pan located beneath said cleaner grid receiving nuts falling through the latter, a discharge conveyor trough receiving nuts from said pan, a valve board located adjacent said pan adjustable to pass the nuts directly into said trough from said pan or subject the nuts to the wind blast through the other of said passages and then into said trough to separate stones and like heavy particles from the nuts.

5. In a peanut picking machine, means for providing a wind blast, a housing, means separating the housing into upper and lower wind blast passages, a cleaner grid subject to the action of the wind blast, a conveyor for removing nuts from the machine, said conveyor being provided with a hopper opening, a valve member coacting with said opening, a deflector in rear of said valve member, said valve member being adjustable to permit the nuts to pass directly from said grid pan into said opening or direct the nuts rearwardly to said deflector and thence into said opening, the nuts when passing rearwardly to said deflector being subjected to the blast of the lower wind blast passage to remove stones and like heavy particles therefrom.

6. In a peanut picking machine, a cleaner grid, a pan located beneath said cleaner grid to receive nuts therefrom, stemmer saws projecting upwardly through said pan to stem the nuts falling onto the latter, a conveyor including a trough having a hopper opening, a valve member located to close said opening from passage of nuts into the trough directly from said pan or direct the nuts rearwardly over said trough, a deflector located in the rear of said valve member for deflecting the nuts into said trough from said valve member, a wind blast, means for directing said blast onto the nuts falling from said deflector and for lifting the nuts into said hopper opening permitting any stones or like heavy particles to fall free of the nuts, and means for controlling the wind blast.

DANIEL F. GOOD.

REFERENCES CITED

The following references are of record in the file of this patent:

UNITED STATES PATENTS

| Number | Name | Date |
|---|---|---|
| 329,602 | Smith | Nov. 3, 1885 |
| 833,700 | Still | Oct. 16, 1906 |
| 861,446 | Emerson | July 30, 1907 |
| 925,983 | Benthal | June 22, 1909 |
| 952,288 | Welfelt | Mar. 15, 1910 |
| 971,770 | McDaniel | Oct. 4, 1910 |
| 1,081,593 | Eisenhart | Dec. 16, 1913 |
| 1,190,471 | Schuette | July 11, 1916 |
| 1,199,667 | Creter | Sept. 26, 1916 |
| 1,230,437 | Schuette | June 19, 1917 |
| 2,071,267 | Schneider | Feb. 16, 1937 |
| 2,349,262 | Good | May 23, 1944 |